United States Patent
Jeong et al.

(10) Patent No.: US 9,804,190 B2
(45) Date of Patent: Oct. 31, 2017

(54) APPARATUS AND METHOD FOR CALIBRATION OF CAPACITANCE MISMATCH AND TEMPERATURE VARIATIONS IN A MEMS DEVICE

(71) Applicant: PANASONIC CORPORATION, Osaka (JP)

(72) Inventors: Yaesuk Jeong, Marlborough, MA (US); Farrokh Ayazi, Marlborough, MA (US)

(73) Assignee: PANASONIC CORPORATION, Osaka (JP)

( * ) Notice: Subject to any disclaimer, the term of this patent is extended or adjusted under 35 U.S.C. 154(b) by 212 days.

(21) Appl. No.: 14/854,879

(22) Filed: Sep. 15, 2015

(65) Prior Publication Data

US 2016/0077126 A1    Mar. 17, 2016

Related U.S. Application Data

(60) Provisional application No. 62/050,378, filed on Sep. 15, 2014.

(51) Int. Cl.
  *G01P 21/00* (2006.01)
  *G01P 15/125* (2006.01)

(52) U.S. Cl.
  CPC ............ *G01P 21/00* (2013.01); *G01P 15/125* (2013.01)

(58) Field of Classification Search
  CPC ............................... G01P 21/00; G01P 15/125
  USPC .......................................................... 702/104
  See application file for complete search history.

(56) References Cited

U.S. PATENT DOCUMENTS

| | | | | |
|---|---|---|---|---|
| 5,241,850 A | * | 9/1993 | Kawate | G01P 1/006 73/1.38 |
| 7,026,807 B2 | * | 4/2006 | Anderson | G01R 35/005 324/130 |
| 8,717,184 B2 | * | 5/2014 | Aebersold | G08B 17/107 250/574 |
| 2004/0150389 A1 | * | 8/2004 | Anderson | G01R 35/005 324/130 |
| 2012/0092176 A1 | * | 4/2012 | Aebersold | G08B 29/22 340/630 |

* cited by examiner

*Primary Examiner* — Harry W Byrne
(74) *Attorney, Agent, or Firm* — McDermott Will & Emery LLP

(57) ABSTRACT

A system and calibration method utilizes time averaging to suppress inherent capacitance mismatches or temperature variations in MEMS devices, such as a tri-axial accelerometer. An calibration interface circuit, operatively coupled the MEMS sensor, effectively cancels a range of non-ideal capacitive mismatches by employing pockets of calibration charges that are controlled by the duty-cycle of a clock.

6 Claims, 7 Drawing Sheets

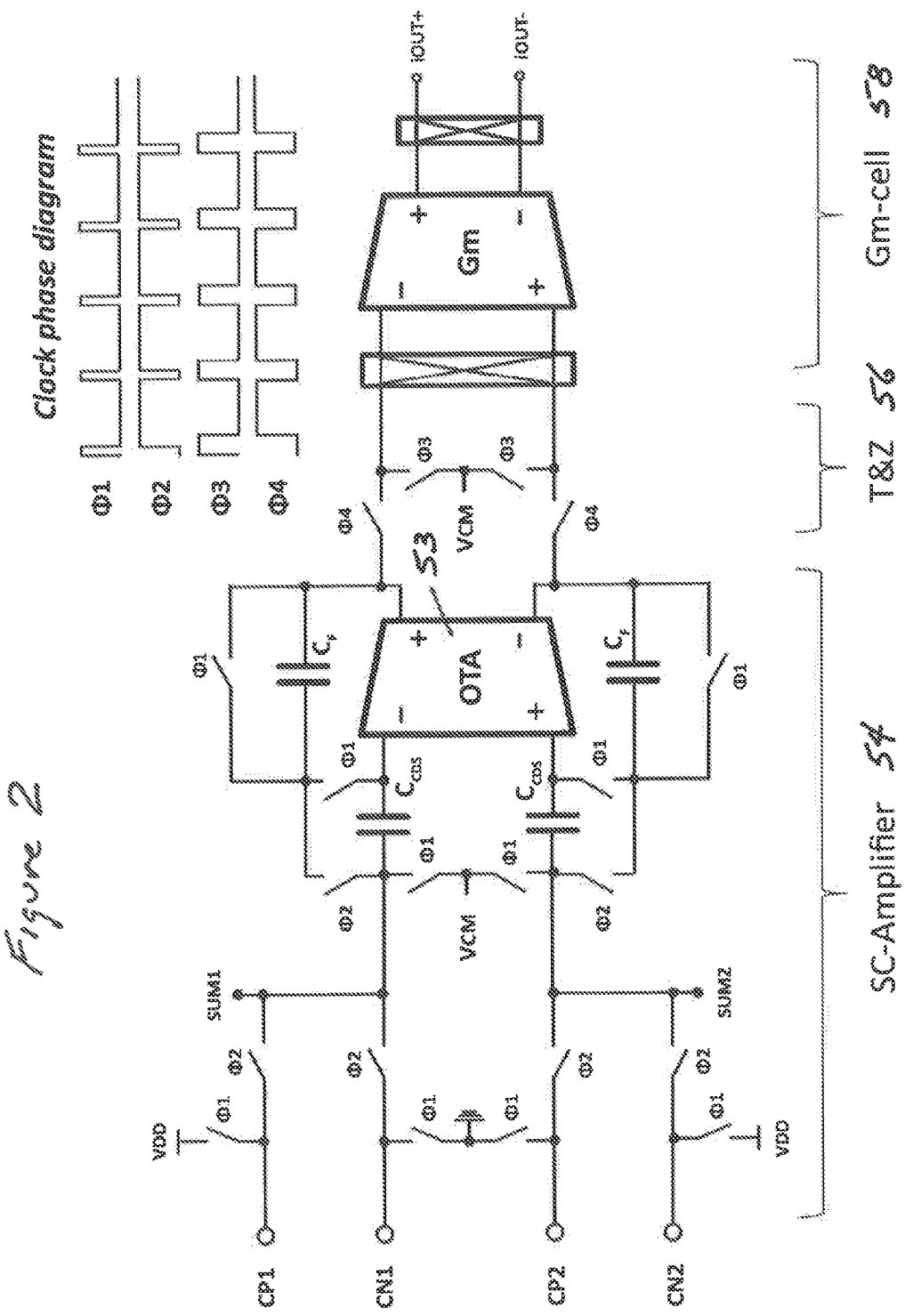

Gm-cell

Fully differential OTA

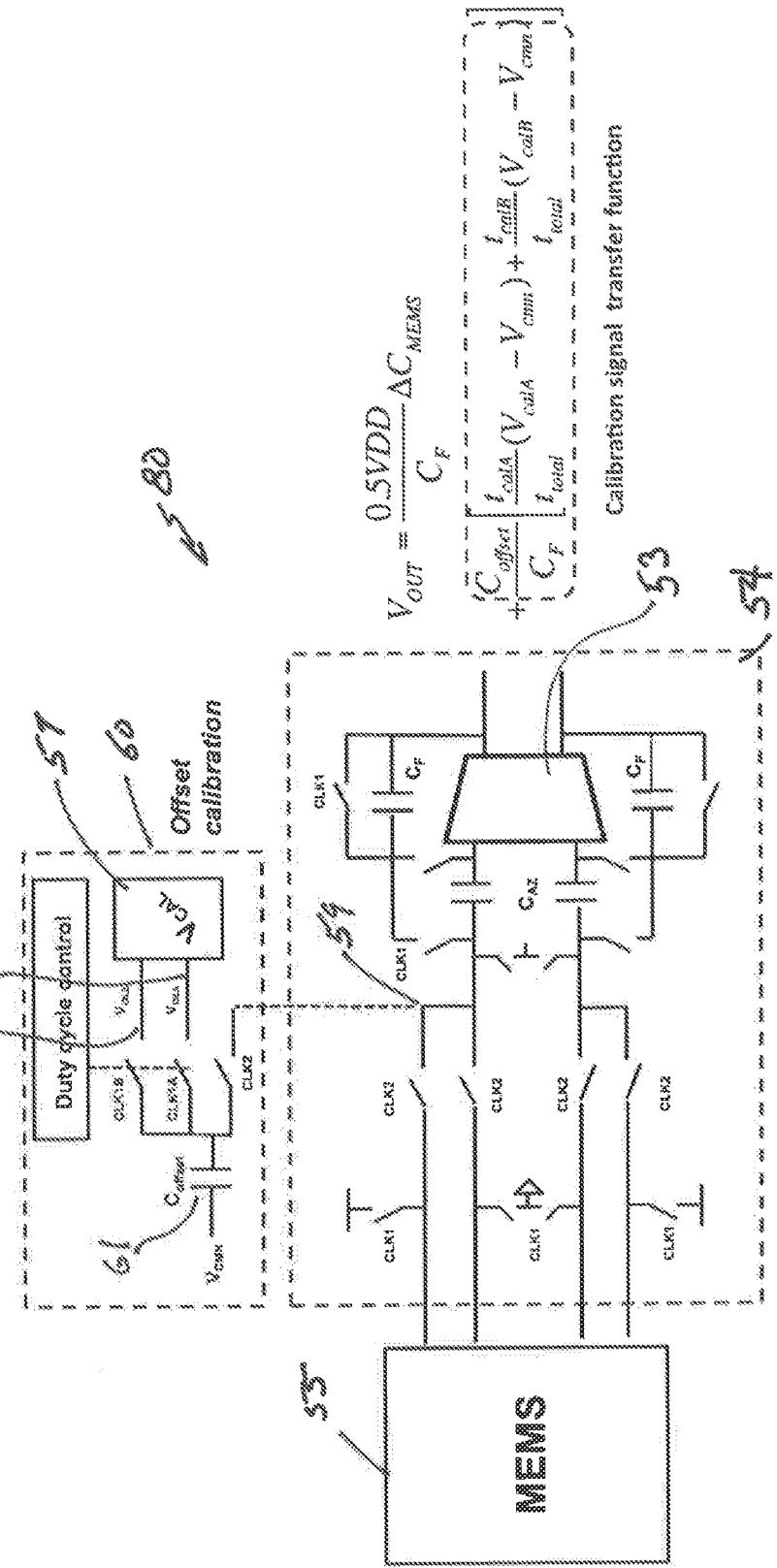

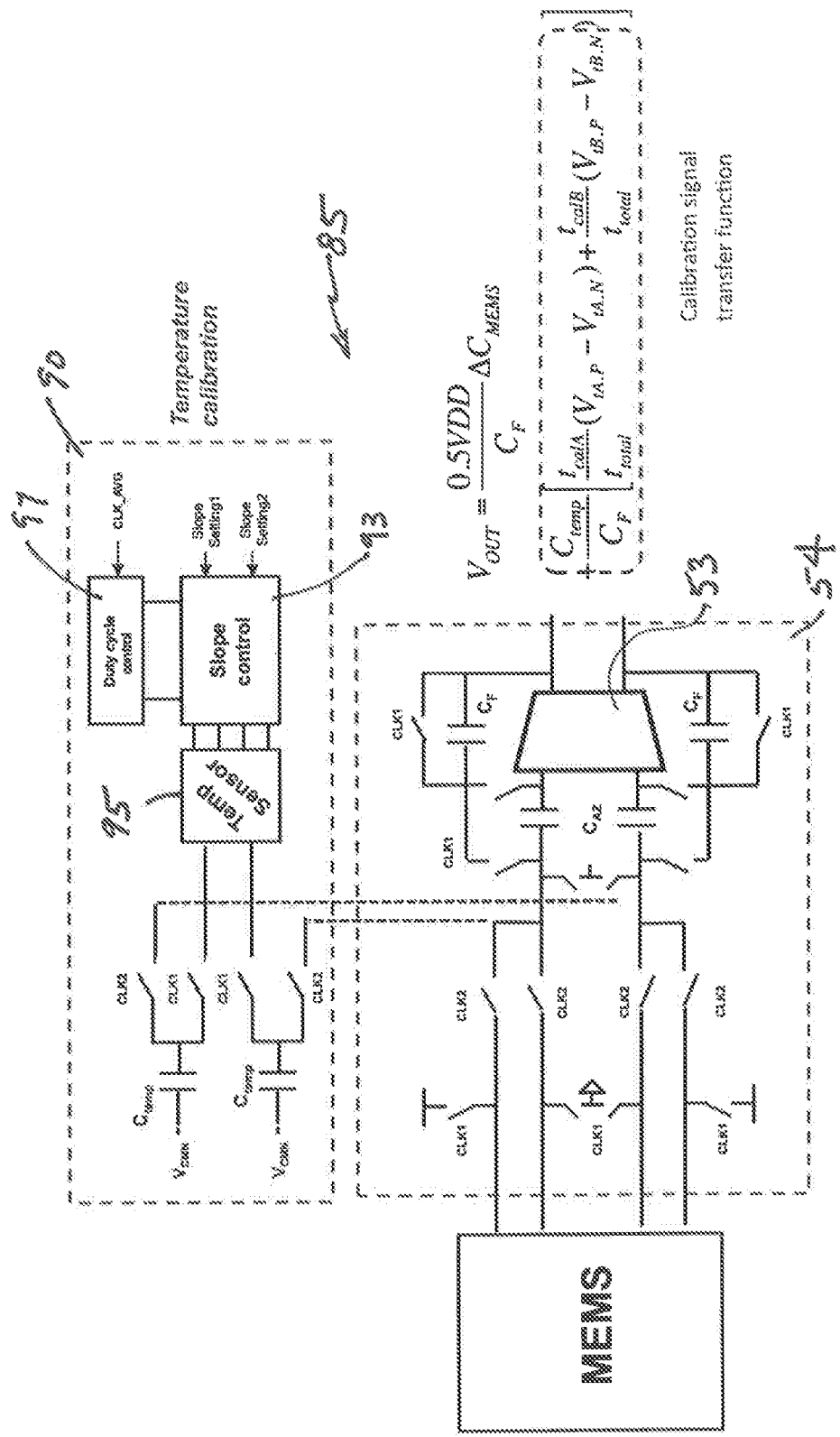

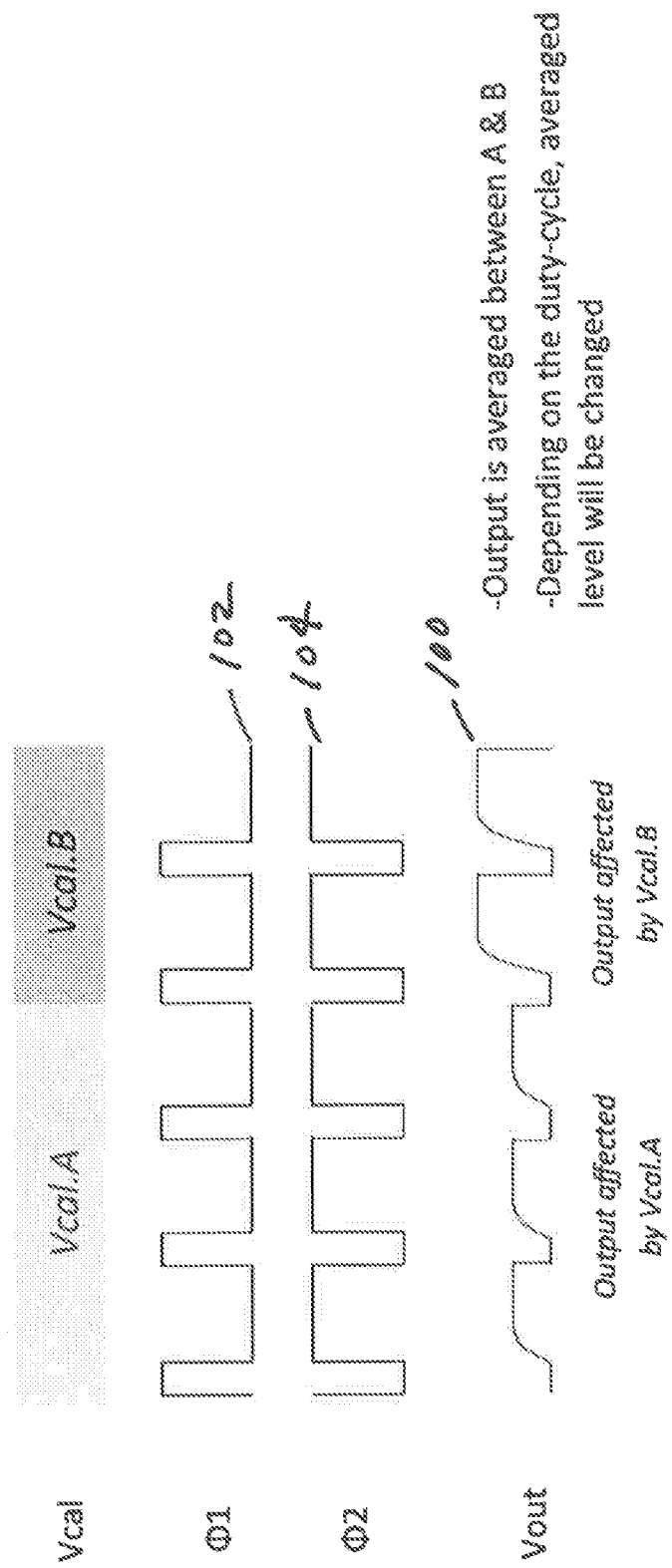

APPARATUS AND METHOD FOR CALIBRATION OF CAPACITANCE MISMATCH AND TEMPERATURE VARIATIONS IN A MEMS DEVICE

FIELD OF THE INVENTION

The disclosure relates to electronic circuitry, and, more particularly, to circuitry for calibrating a MEMS gyroscope.

BACKGROUND OF THE INVENTION

As the application of inertial measurement devices, such as Micro-Electromechanical Sensor (MEMS) accelerometers and gyroscopes expands into areas that have not been exploited before, e.g. wearable technology, Internet access devices, navigation devices, etc., the form-factor of such devices becomes a critical metric in designing the sensor element. This metric brings about an inevitable reduction in proof-mass size, which results in smaller device sensitivity, requiring higher gain analog front-ends. However, non-ideal capacitance mismatches in a differential accelerometer ($C_P$-$C_N$) caused by process variation or package parasitic, are also amplified by the increased gain, which, if left uncompensated, can create a large offset voltage at the output, thereby deteriorating the system performance. When size of the sensor scales down, its impact on system performance can be even greater as parasitic capacitances are not affected by such scaling.

A MEMS accelerometer interface circuit can be used to converts the capacitance change caused by the acceleration, into the electrical signal, However, if there is any mismatch between MEMS capacitors, it will result in a huge offset, or temperature dependent variation that would deteriorate sensor performance.

Accordingly, a need exists for calibration circuitry in MEMS accelerometer interface circuit that can be used to address mismatch between MEMS capacitors.

SUMMARY OF THE INVENTION

Disclosed is a system and calibration method which utilizes a time averaging concept to suppress inherent capacitance mismatches or temperature variations in a MEMS device, such as a tri-axial accelerometer. An interface circuit, operatively coupled the MEMS sensor, effectively cancels a range of non-ideal capacitive mismatches by employing pockets of calibration charges that are controlled by the duty-cycle of a clock. The disclosed technique compensates for mismatches, either capacitance or temperature variation, by delivering two different calibration signals in different time periods. More specifically, two different calibration signals are injected into the signal amplification path at different time periods and averaged. Performing such operation at very high speeds, the MEMS accelerometer, which has very low operational bandwidth, will only see the averaged signal, thereby achieving a much finer resolution. Experimental measurement results indicate more than 50 dB reductions in offset level for both in-plane and out-of-plane accelerometer designs.

According to one aspect of the disclosure, a method for calibrating a sensor comprises: A) receiving a sensor output signal into an signal amplification signal path; B) introducing into the signal amplification path a first calibration signal during a first time period; C) introducing into the signal amplification path a second calibration signal during a second time period different from the first time period; and D) generating a processed output signal representing an average of signals within the signal amplification path. In one embodiment, D) comprises generating a processed output signal representing an average of the received sensor output signal within at least one of the first calibration signal and the second calibration signal. In one embodiment, the first calibration signal is introduced into the amplification signal path during a first phase of a clock signal, and the second calibration signal is introduced into the amplification signal path during a second phase of the clock signal different than the first phase of the clock signal.

According to another aspect of the disclosure, a system for calibrating a sensor comprises: A) sensor generating a plurality of output signals; B) an amplifier module responsive to the plurality of output signals from the sensor; C) an offset calibration module for providing a plurality of calibration signals to the amplifier module; wherein first and second calibration signals received by the amplifier module from the offset calibration module are used to process one of the plurality of output signals from the sensor and to generate an averaged output signal therefrom. In one embodiment, the first calibration signal is received by the amplifier module during a first phase of a clock signal and the second calibration signal is received by the amplifier module during a second phase of the clock signal different from the first phase, According to yet another aspect of the disclosure, a system for calibrating a sensor comprises: A) an interface for receiving a plurality of output signals; B) an amplifier module responsive to the plurality of output signals from the sensor; C) an offset calibration module for providing a plurality of calibration signals to the amplifier module; wherein first and second calibration signals received by the amplifier module from the offset calibration module are used to process one of the plurality of output signals from the sensor and to generate an averaged output signal therefrom, In one embodiment, the first calibration signal is received by the amplifier module during a first phase of a clock signal and the second calibration signal is received by the amplifier module during a second phase of the clock signal different from the first phase.

BRIEF DESCRIPTION OF THE DRAWINGS

Embodiments of the disclosed subject matter are described in detail below with reference to the following drawings in which;

FIG. 2 illustrates schematically the analog front-end components, including an SC-amplifier, Track & Zero switch and $G_m$-cell, of the calibration interface circuit of FIG. 1 in accordance with the disclosure;

FIG. 6 illustrates conceptually a system block diagram a sensor and calibration interface circuit in accordance with the disclosure;

FIG. 7 illustrates conceptually a system block diagram a sensor and calibration interface circuit including a temperature compensation circuit with an SC-Amp in accordance with the disclosure; and FIG. 8 illustrates an and averaged output signal and its constituent components in accordance with the disclosure.

DETAILED DESCRIPTION

The present disclosure will be more completely understood through the following description, which should be read in conjunction with the drawings. The skilled artisan will readily appreciate that the methods, apparatus and systems described herein are merely exemplary and that variations can be made without departing from the spirit and scope of the disclosure.

Technologies disclosed herein are directed towards sensing rotation and acceleration around all three axes of free space using an inertial measurement MEMS device. Such devices may have six degrees of freedom in their mechanical design to be able to sense six independent motion signals, i.e. linear acceleration along and angular velocity signals around three orthogonal axes of free space.

Figure 1:
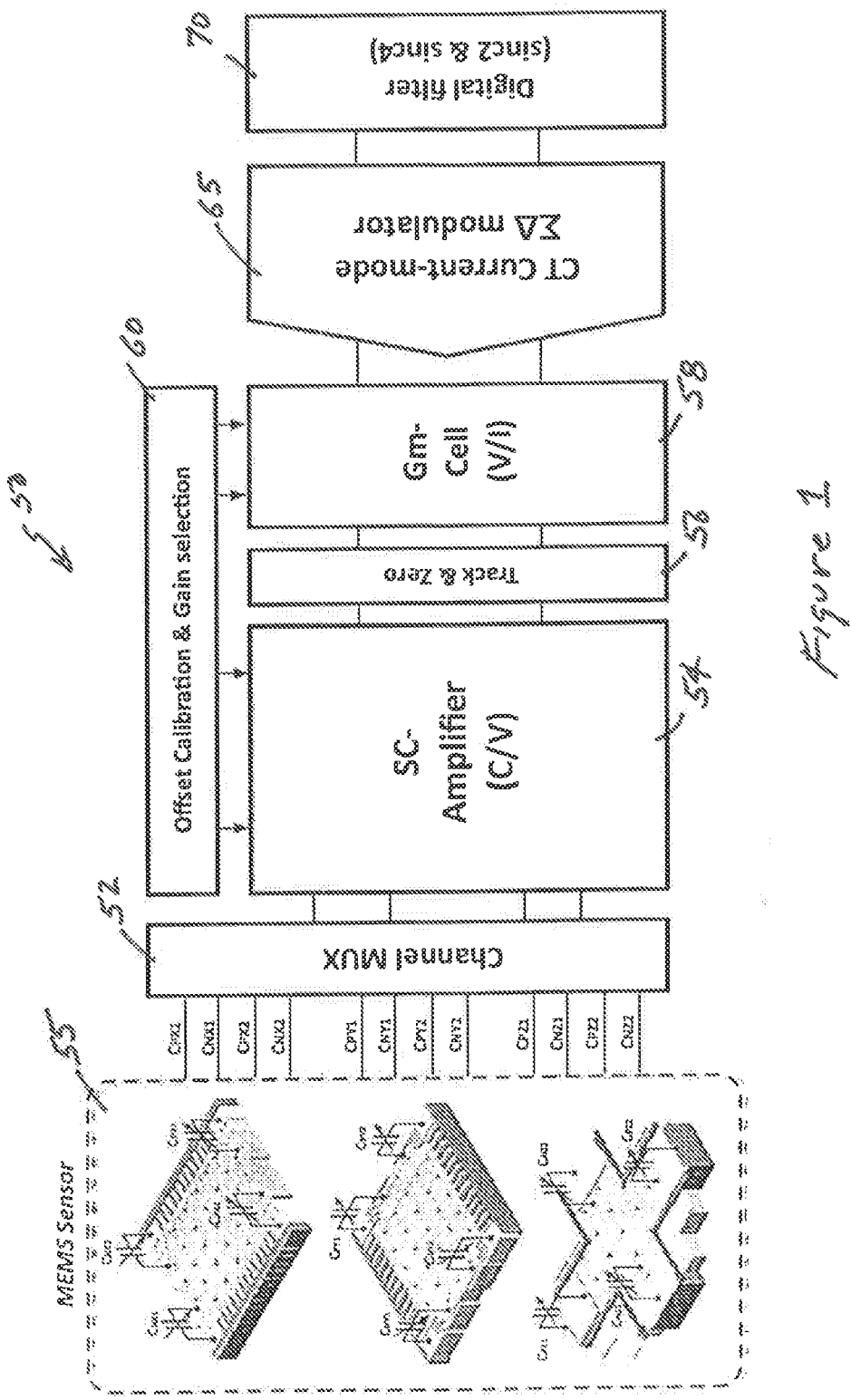
FIG. 1 illustrates conceptually a system diagram a sensor and calibration interface circuit in accordance with the disclosure.

FIG. 1 illustrates a hybrid system block diagram of the interface circuit 50 interconnected to a sensor 55. The sensor 55 may have implemented as a part thereof lateral and vertical capacitive sensing gaps, e.g. ~300 nm, that are significantly smaller than that of conventional designs, e.g. ~2 μm. Such a feature enables the design of higher bandwidth accelerometers with smaller mass and more stable operation under low-pressure environment (1~10 Torr). Multiple sensor elements, e.g. a one for each of the X-axis, Y-axis, and Z-axis, are connected to interface circuit 50.

Sensor 55 may be implemented in accordance with any number of state-of-the-art MEMS devices, such as those disclosed in U.S. Pat. Nos. 7,578,189; 7,892,876; 8,173,470; 8,372,67; 8,528,404; 7,543,496; and 8,166,816, which are able to sense rotational (I.e, angle or angular velocity of rotation around an axis) or translational motion (I.e. linear acceleration along an axis) around and along multiple axes, the subject matters of which are incorporated herein by this reference for all purposes. Sensor 55 may be manufactured in accordance with a process known as High Aspect Ratio Poly and Single Silicon (HARPSS) as disclosed in U.S. Pat. No. 7,023,065 entitled Capacitive Resonators and Methods of Fabrication by Ayazi, et al., the subject matter of which is also incorporated herein by this reference for all purposes.

Sensor 55 is coupled to a calibration interface circuit 50 which, in an illustrative embodiment, comprises a channel-switching multiplexer 52, amplifier 54, track and zero module 56, a transconductance Gm-cell filter (Gm-cell) 58 and offset calibration & gain selection logic 60, which collectively form an analog front end to circuit 50. Circuit 50 further comprises a ΣΔ modulator 65 and digital filter 70.

Figure 4B:
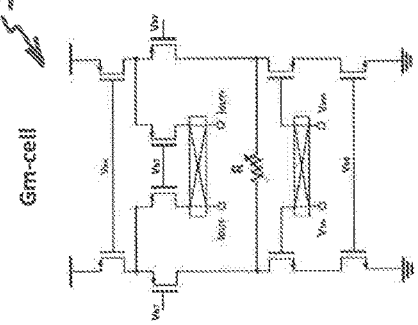
FIG. 4B illustrates schematically a $G_m$-cell of the calibration circuit in accordance with the disclosure.
Figure 4A:
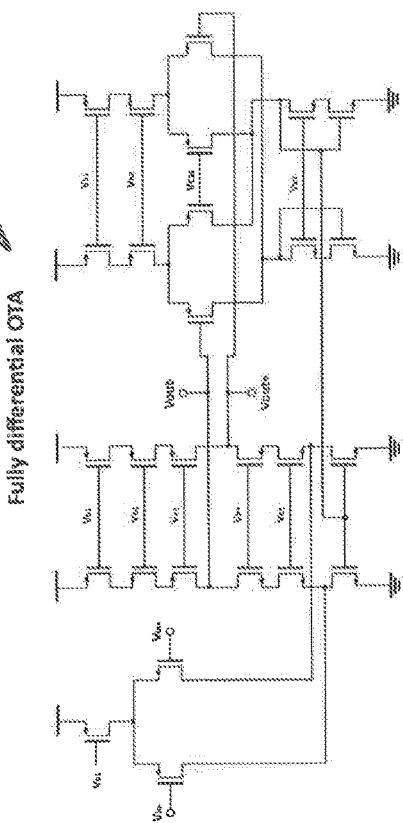
FIG. 4A illustrates schematically a differential OTA of the calibration circuit in accordance with the disclosure.
Figure 5:
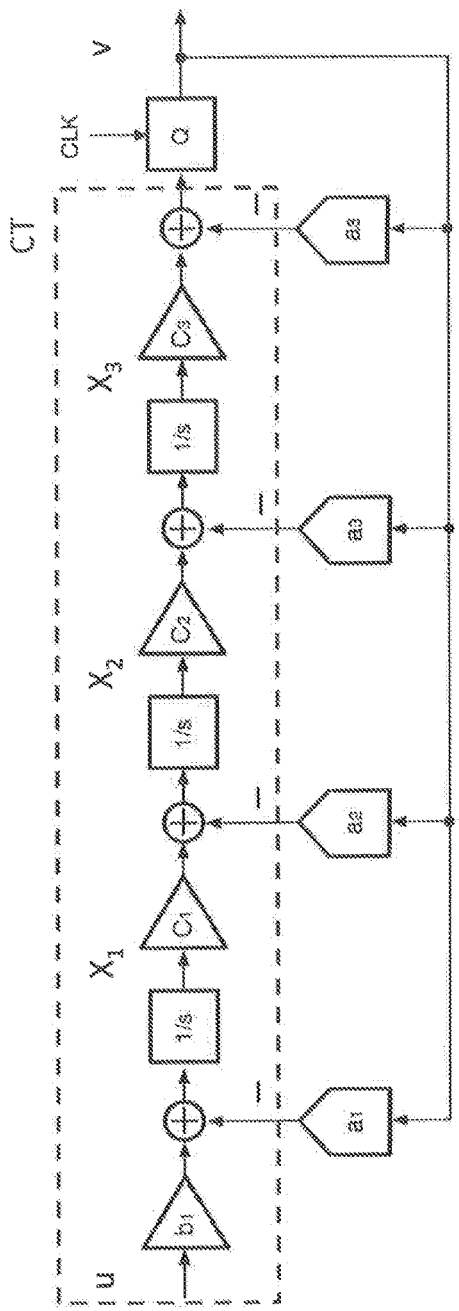
FIG. 5 illustrates schematically a $\Sigma\Delta$ modulator of the calibration circuit in accordance with the disclosure.

Amplifier 54 comprises an operational transconductance amplifier (OTA), and a plurality of switches and capacitors having the configuration illustrated in FIG. 2. Similarly, module 56 and GM-cell 58 may be implemented as also illustrated in the schematic diagram of FIG. 2. FIGS. 4A and 4B illustrate transistor level schematic diagrams of exemplary implementations of the OTA of amplifier 54 and Gm-cell 58, respectively. FIG. 5 is a schematic diagram of the ΣΔ modulator 65.

Figure 3A:
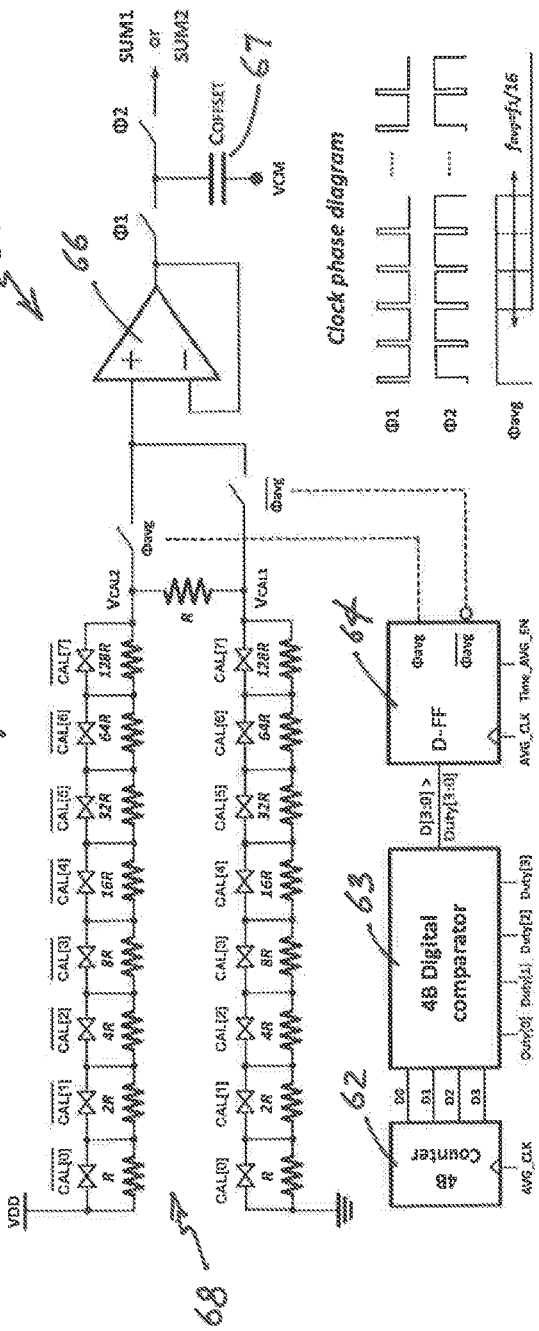
FIG. 3A illustrates an offset calibration block in accordance with the disclosure.
Figure 3B:
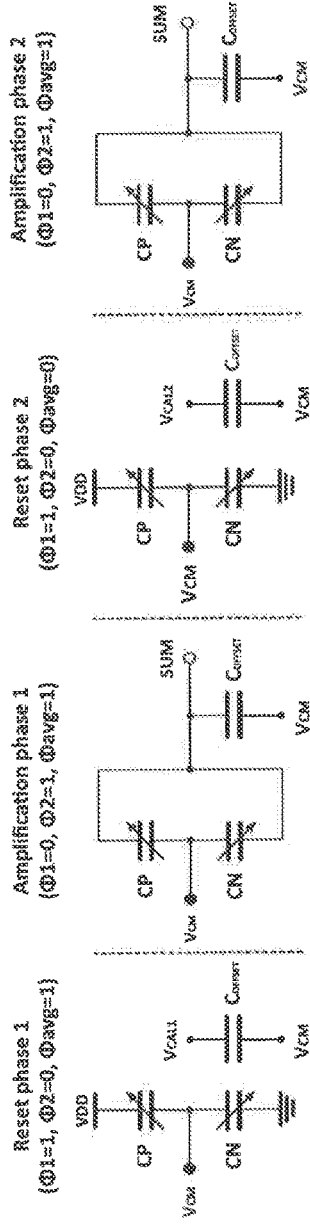
FIG. 3B illustrates an offset calibration its operation when time-averaging is enabled in accordance with the disclosure.

Offset calibration gain & gain selection logic 60 comprises a four bit counter 62, four bit digital comparator 63, D flip-flop 64, operational amplifier 66, plural switches and capacitor 67 and resistor ladder 68 in the configuration illustrated in FIG. 3A. FIG. 3A further illustrates a clock phase diagram. FIG. 3B illustrates conceptually the value of $C_{OFFSET}$ during reset and amplification phases.

In operation, the outputs of sensor 55 are coupled to interface circuit 50 and are constantly time-multiplexed using channel-switching multiplexer 52. Acceleration-induced capacitance changes in the outputs of sensor 55 are sensed using SC-amplifier 52 and $G_m$-cell 54. SC-amplifier 52 consecutively charges, e.g. during clock phase $\phi_1=1$ with $\phi_2=0$, and discharges, during clock phase $\phi_1=0$ width $\phi_2=1$, the capacitance from MEMS sensor 55 under a clock frequency, e.g. 750 kHz, converting the stored charge into voltage. Then, $G_m$-cell 54 converts the voltage into a current and provides the current into the current-input of ΣΔ modulator 65. As illustrated in FIG. 4A, a folded-cascode fully differential amplifier is used to implement OTA inside the SC-amplifier 52, both correlated-double-sampling (CDS) and chopper stabilization are employed on the analog front-end to eliminate 1/f noise and DC offset, as illustrated in FIG. 2 and FIG. 3A. The duty cycle of the reset phase is shorter (1/8) than the other phase (7/8) to increase the signal strength during continuous-time analog to digital conversion. The switches of track and zero module 56 disposed intermediate 52 SC-amplifier and $G_m$-cell 59 are controlled by another clock $\phi_3$ and $\phi_4$, which has a different duty cycle, e.g. $\phi_3=2/8$ and $\phi_4=6/8$, so that any 1/f noise during reset and initial settling period of amplification phase is not transferred to ΣΔ modulator 65. The ΣΔ modulator 65 generates a pulse-width-modulated (PWM) bit-stream, which is digitally filtered thereafter by digital filter 70. Any non-ideal capacitive mismatches on the sensor 55 are therefore suppressed by calibration circuit 50 connected to the analog front-end.

Unlike prior art designs, the disclosed system utilizes a precisely controlled charge pocket to cancel non-ideal capacitance mismatch in the sensor, Referring to FIG. 313, during reset phase ($\phi_1=1$, $\phi_2=0$), fixed capacitor $C_{OFFSET}$ is charged with $V_{CAL1}$, which may be trimmable using an 8-bit binary weighted resistor ladder 68. At the consecutive amplification phase ($\phi_1=0$, $\phi_2=1$), $C_{OFFSET}$ is switched to summing node (SUM1 or SUM2) of the SC-amplifier 52, transferring stored charges into the signal path, The disclosed method provides finer resolution as well as wide calibration range in a smaller silicon area. For example, 100 femto-farad (fF) capacitance and 10 mV $V_{CAL}$ step size guarantees resolution level less than 1 fF.

The resolution level can reach atto-farad (aF) range by enabling the time-averaging function. $V_{CAL2}$, which is 1 LSB step higher than the $V_{CAL1}$, is also generated and switched between two calibration voltages under averaging clock frequency ($f_{AVG}=f_{CLK}/16$). The $C_{OFFSET}$ is charged with different voltages ($V_{CAL1}/V_{CAL2}$) depending on the phase of averaging clock and corresponding charges are transferred into the signal path respectively. As the following operation takes place at much faster speed compared to sensor bandwidth, any high frequency ripple caused by the voltage switching filters out, showing only median value at the output. The effective transferred charge can be trimmed at a much finer scale by changing the duty cycle of averaging clock, which has 4-bit programmability, as illustrated in FIG. 3A. The resolution level of time-averaging function is dependent on the digitally controlled duty-cycle, which brings robustness against process or temperature variation.

A $3^{rd}$ order continuous time current-mode ΣΔ modulator 65 whose system block diagram is shown on FIG. 5, is used to convert the analog acceleration signal into a serial bit-stream. The continuous time architecture has the advantages in terms of not needing separate anti-aliasing filter and lower power consumption. The modulator 65 may be implemented with cascading integrators with distributed feedback structure, as illustrated in FIG. 5. After the modulator 65, a digital filter coupled to the modulator 65 can be used to eliminate the up-converted quantized noise, using a decimation frequency reconfigurable based on different applications requirements.

In an illustrative embodiment, the interface circuit 50 may be fabricated using 0.13 μm standard CMOS processing, where area including analog front-end, ΣΔ modulator 65, and other bias circuitry takes less than 1.25 mm². A fabricated ASIC on which the circuit 50 is implemented may be wire-bonded to wafer-level packaged sensor on a ceramic package to characterize its performance. The system may be supplied by the external 3.3 V, and regulated down to 2.5 V using internal LDO. Overall current consumption maybe equivalent to 300 μA.

In accordance with a simplified embodiment, FIG. 6 illustrates a hybrid system block diagram of an a calibration interface circuit 80. Sensor 55 is coupled to a calibration interface circuit 80 which, in an illustrative embodiment, comprises amplifier 54, and offset calibration & gain selection logic 60, as illustrated. The corresponding calibration signal transfer function is also illustrated in FIG. 6. During operation, capacitor 61 ($C_{offset}$) is continuously charged and discharged with different calibration signals. During a first phase of operation, i.e. the charging phase, the capacitor 61 is connected to a calibration voltage node 51, $V_{CAL1}$, storing charge that is equivalent to $C_{offset}*(V_{CALA}-V_{CMN})$. On next phase, i.e. the amplification phase, the charged capacitor 61 is connected to a summing node $V_A$. As the voltage there will be similar to $V_{CM}$, the voltage potential across the capacitor will be zero, and the stored charge will be transferred to the signal path of the readout circuit.

When the averaging clock is low, the capacitor Coffset is connected to calibration signal node 53, $V_{CALB}$, during charging phase. The difference between the two voltages will typically be a few tens of millivolt, depending on the resolution of calibration voltage generator 57. The stored charge in the capacitor will then be $C_{offset}*(V_{CAL2}-V_{CMN})$, and transferred to signal path 59 during subsequent amplification phase.

As the switching speed of the circuit 60 will be several orders higher than the bandwidth of sensor 55, high frequency ripples caused by switching of two dock signals 102 and 104 are filtered out, effectively resulting in an averaged output signal 100, computed as the differential between the outputs of OTA 53, and which signal represents the processed acceleration output of sensor 55, as illustrated in FIG. 8. By changing the duty cycle of the averaging dock, the average level of $V_{out}$ signal will be changed, effectively enabling the calibration signal to be trimmed to a much smaller resolution.

FIG. 7 illustrates a hybrid system block diagram of an a calibration interface circuit 85. Calibration interface circuit 85, in an illustrative embodiment, comprises amplifier 54 and temperature compensation block 90, as illustrated. The corresponding calibration signal transfer function is also illustrated in FIG. 7. Temperature compensation block 90 comprises temperature sensor 95, slope control logic 93 and duty cycle control logic 97. The duty cycle control logic 97 is connected to the slope control logic 93, to apply different slope settings under dock phase of the averaging dock (CLK_AVG). Two slope settings 1, 2 may be provided, and, when the averaging clock is high, temperature sensor 95 is controlled by slope setting 1 and vise versa. As with the calibration circuit of FIG. 6, the outputs of OTA 53 in FIG. 7, represents the processed acceleration output of sensor 55.

A similar procedure as that described above with reference to FIG. 6 can be applied to the temperature compensation block 90, by connecting the calibration signal input to the differential output of temperature sensor 95, as illustrated in FIG. 7. Even though the temperature sensor 95 has course programmability for changing its slope, by adopting the disclosed time-averaging technique, much smaller temperature slope is obtained.

Temperature sensor 95, generates voltages that change differentially with ambient temperature. The Temperature coefficient (TC) of the output is programmable based on given register setting. Generated voltages consecutively charge and discharge a capacitor, Ctemp, transferring the stored charge from the capacitor into the signal path. As the charges changes with temperature, it works as a calibration signal against temperature variation on MEMS sensor 55.

The temperature sensor 95 may have five bit programmability. When a finer resolution step is required, the disclosed time-averaging function, which toggles different slope settings, can be enabled. For example, when time-averaging function is enabled, two different register setting A and B are applied to the temperature sensor 85. When the averaging clock is high, temperature sensor 95 will generate a voltage based on the setting of register A, and when the averaging clock is lower, temperature sensor 95 will generate a voltage based on the setting of register B. Through following technique, median TC value between two different settings can be achieved.

The reader will appreciate that the proposed technique requires much less complexity as it requires a fixed capacitor, and saves large silicon estate on an integrated circuit. Furthermore, by tuning voltage and time duration, a much smaller tuning resolution is achieved. The disclosed time-averaging technique depends on the duty cycle between the calibration signal(s), making it less susceptible to other environmental variations.

It will be obvious to those reasonably skilled in the art that modifications to the apparatus and methods disclosed here in may occur, including substitution of various component values or nodes of connection, without parting from the true spirit and scope of the disclosure.

What is claimed is:

1. A method for calibrating a sensor comprising:
   A) receiving a sensor output signal into an signal amplification signal path;
   B) introducing into the signal amplification path a first calibration signal during a first time period;
   C) introducing into the signal amplification path a second calibration signal during a second time period different from the first time period; and
   D) generating a processed output signal representing an average of signals within the signal amplification path.

2. The method of claim 1 wherein D) comprises:
   D1) generating a processed output signal representing an average of the received sensor output signal within at least one of the first calibration signal and the second calibration signal.

3. The method of claim 1 wherein D) comprises:
   D1) generating a processed output signal representing an average of the first calibration signal and the second calibration signal.

4. The method of claim 1 wherein the first calibration signal is introduced into the amplification signal path during a first phase of a clock signal.

5. The method of claim 4 wherein the second calibration signal is introduced into the amplification signal path during a second phase of the clock signal different than the first phase of the clock signal.

6. The method of claim 1 wherein A) comprises:
   A1) multiplexing a plurality of a sensor output signals into the signal amplification signal path in synchronization with a clock signal.

* * * * *